Figure 1:
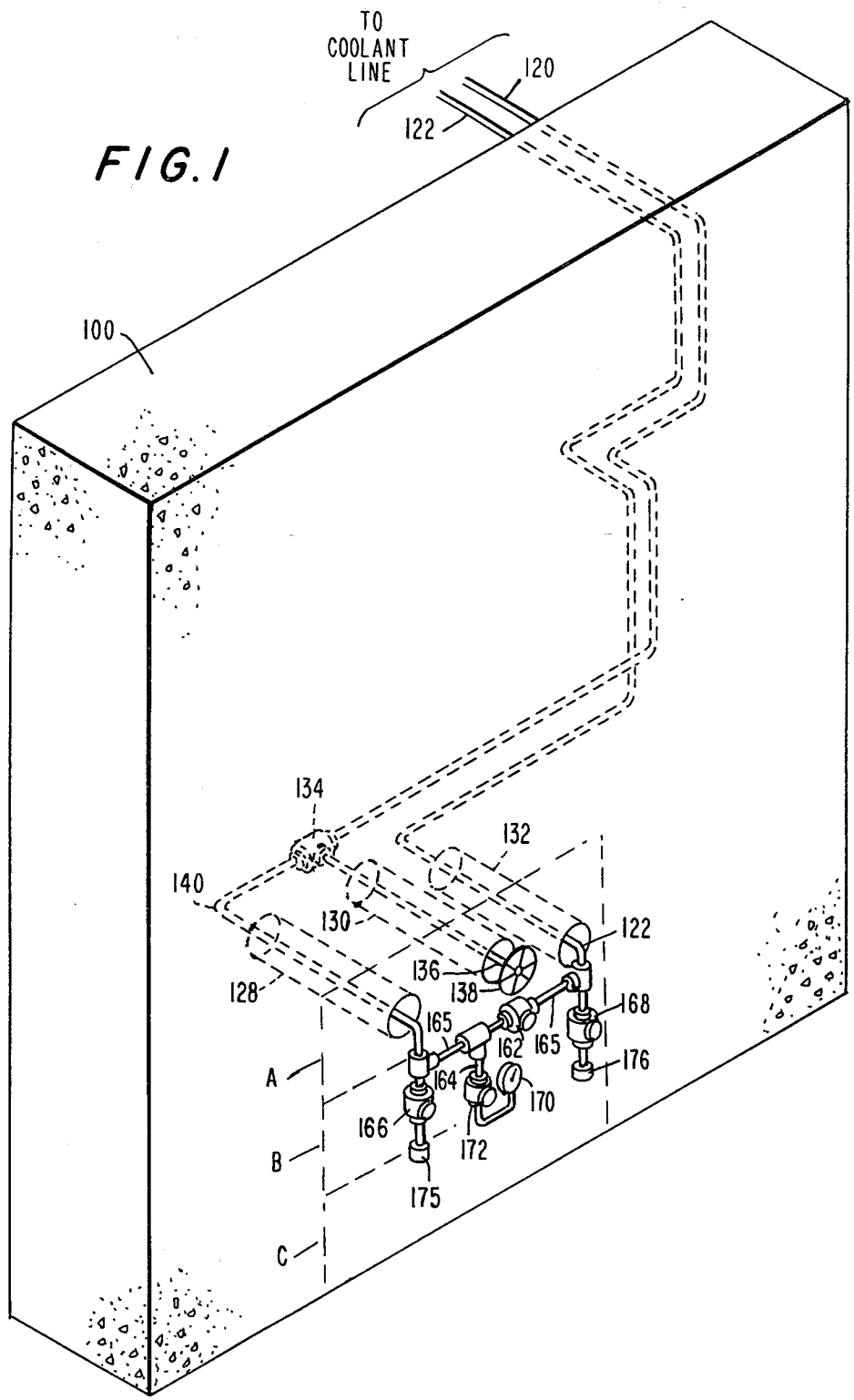

United States Patent [19]

Calabrese et al.

[11] 4,446,097
[45] May 1, 1984

[54] POST ACCIDENT ANALYSIS

[76] Inventors: Donald P. Calabrese, Louise La., R.D. 4, Hopewell Junction, N.Y. 12533; Matthew T. Kerns, 2 Raker Rd., Poughkeepsie, N.Y. 12603; Dennis M. Quinn, Shadow La., R.D. 2, Hopewell Junction, N.Y. 12533

[21] Appl. No.: 230,623

[22] Filed: Feb. 2, 1981

[51] Int. Cl.³ .................... B01D 53/30; G21C 17/00
[52] U.S. Cl. .................................. 376/256; 376/314; 55/270
[58] Field of Search ................ 376/256, 314; 23/230, 23/3 R; 55/267–269, 270

[56] References Cited

U.S. PATENT DOCUMENTS

| | | | |
|---|---|---|---|
| 3,320,969 | 5/1967 | Gordon | 376/256 |
| 3,444,725 | 5/1969 | Chave | 376/256 |
| 3,788,813 | 1/1974 | Busch | 376/256 |
| 3,890,100 | 6/1975 | Busch | 376/256 |
| 3,977,232 | 8/1976 | Hickam et al. | 376/256 |
| 4,057,464 | 11/1977 | Mair et al. | 376/314 |
| 4,081,323 | 3/1978 | Gan, Jr. et al. | 376/314 |
| 4,226,675 | 10/1980 | Lewis et al. | 376/256 |
| 4,277,361 | 7/1981 | Szulinski | 376/314 |

OTHER PUBLICATIONS

KAPL-1868, (12/16/63), Woltman, pp. 72–76.

Primary Examiner—Sal Cangialosi
Attorney, Agent, or Firm—Brooks, Haidt, Haffner & Delahunty

[57] ABSTRACT

This invention relates to monitoring the condition of a nuclear power generating facility and has particular applicability to isolating samples of primary coolant from a pressured water reactor to enable analysis in a post accident environment.

1 Claim, 10 Drawing Figures

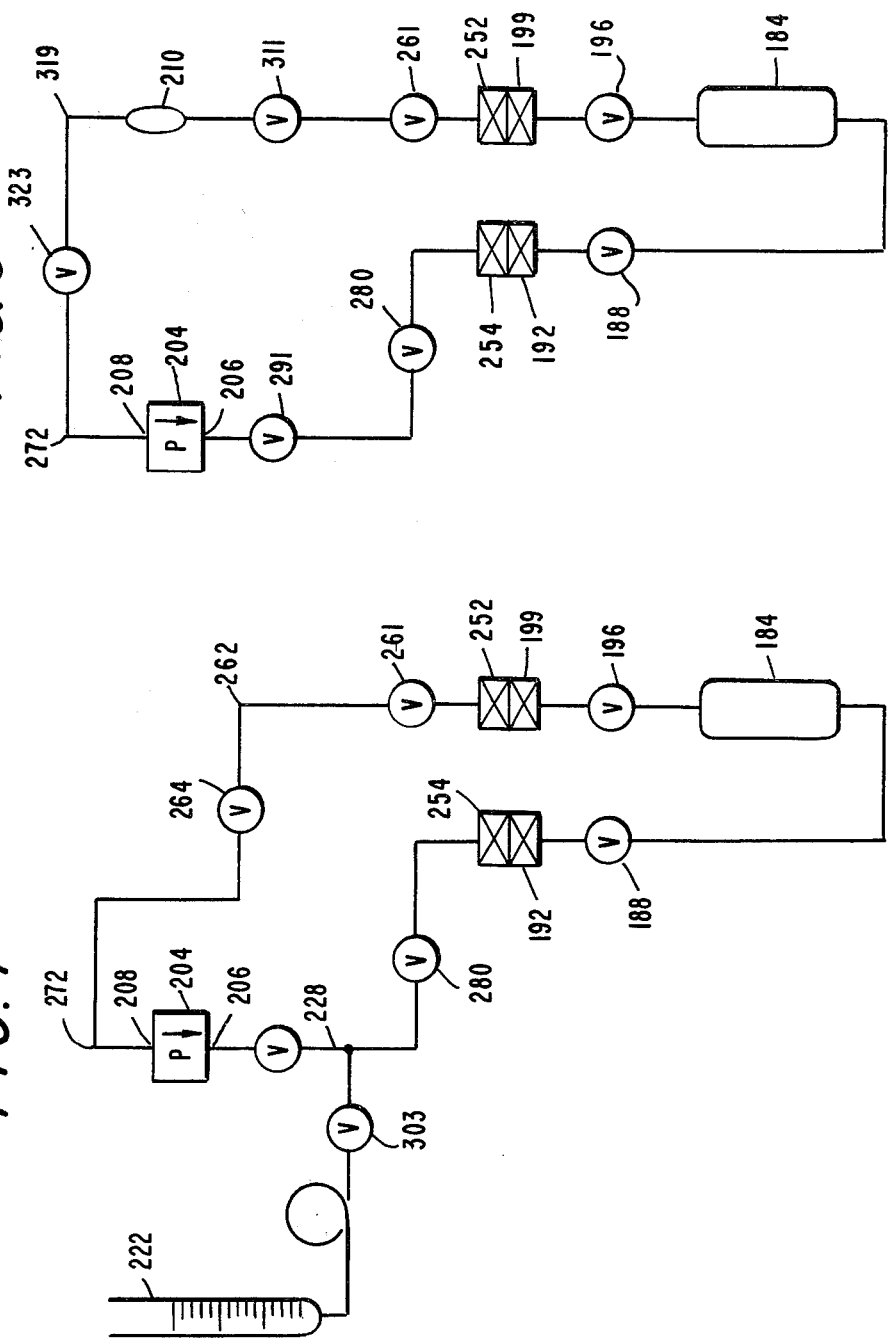

POST ACCIDENT ANALYSIS

BACKGROUND OF THE INVENTION

Regular analysis of the primary coolant of a pressured water nuclear reactor is necessary to determine and measure the presence of a number of components, such as dissolved hydrogen and oxygen, chloride, total activity and boron. The primary cause of corrosion is, of course, the presence of oxygen dissolved in the coolant. Measurement of dissolved oxygen is therefor important. Oxygen concentration is minimized by introduction of hydrogen gas into the coolant. Hydrogen acts as a corrosion inhibiter by combining with the oxygen under reactor conditions to reduce the concentration of oxygen; hence the measurement of dissolved hydrogen is also important. Hydrogen concentration is also a measure of core damage and hence becomes increasingly important in the event of an accident. The measurement of the total dissolved gases is also customarily performed. Radio-active materials present in the coolant are primarily present in the form of noble gases, and activity measurement is obviously necessary from a health and safety standpoint. Boron is used in the primary coolant as a moderator to control the fission process by introduction as boric acid; hence the concentration of boron must also be determined regularly.

Except in the case of oxygen determination, which is measured by a probe in a flow cell connected in line with the primary coolant, it is necessary to draw samples of the primary coolant for analysis purposes to determine the remaining components. A shielded sampling room is provided for this purpose. The primary coolant flows through a line in the sampling room, such that samples of the pressurized coolant can be drawn for subsequent analysis outside of the containment. Typically samples on the order of 500 ml are used.

In the event of a nuclear accident continued regular analysis of the primary coolant, as well as of the containment atmosphere and of the stack vent to the atmosphere is essential, even more so than during normal operation. In the event of an accident, however, the radioactivity of the primary coolant may be increased by several orders of magnitude, for example 10,000 times. Under these conditions human access to the sample room is out of the question, and an alternate means of sampling the primary coolant must be provided.

It is thus a principal object of this invention to permit post accident withdrawal of samples of the primary coolant outside of the sampling room and to permit analysis of such samples without harmful exposure to personnel or the environment. It is also an object of this invention to provide a simple apparatus and method for determining dissolved gases in a pressurized coolant, as well as for isolating liquid and gas samples to permit subsequent analysis for hydrogen, total activity, chloride and boron under conditions minimizing exposure to personnel and the environment.

In order to carry out this invention the wall of the sampling room is modified to permit temporary diversion of a representative stream of primary coolant from the sampling room into a shielded compartment on the exterior wall of the sampling room. Doors are provided for access to the shielded compartment for the purpose of operating a diverter valve located within the sampling room temporarily to produce flow of primary coolant through piping, also located within the shielded compartment, and for the purpose of introducing a sample cask into the compartment for receiving a sample from the external piping to which the sample cask is temporarily connected. After the sample is collected and temporary flow stopped, the cask is removed and transported to the location of the test equipment.

In accordance with this invention analysis apparatus housed in a shielded case having a lead glass viewing window is utilized to withdraw the sample of coolant from the sample cask and dilute the sample with water and air thereby lowering the concentration of the activity of the sample. The apparatus contained within the case is designed to measure dissolved gases much in the manner of the conventional Shirley rig and thereafter to separate the diluted gases from water in a collection zone from which a minute, e.g. 1 $\mu$l, sample can be withdrawn through a septum for analysis by gas chromotography for hydrogen and by gamma spectroscopy for noble gases.

The analysis apparatus is also arranged to deliver a sample of the diluted liquid coolant to a beaker contained within the case in which chloride is determined utilizing electrodes positioned in the beaker which are electrically connected externally of the case to make the chloride determination. Provision is also made for withdrawal of a small amount, e.g., 1 ml of the liquid from the beaker for immediate dilution on the order of one thousand fold for determination of boron by plasma emission spectroscopy. The same liquid sample with further dilution is also used for determination of liquid isotopes. The prior stripping of the dissolved gases removes a substantial portion of the activity, which is contained primarily in the noble gases. Consequently the removal of a sample as large as one milliliter of diluted coolant does not pose a serious health hazzard.

The apparatus is further provided for delivering the withdrawn and diluted sample to a shielded waste cask subsequent to analysis.

The entire operation is arranged such that collection of the sample and delivery to the analysis apparatus can take place in less than one hour and such that the total time required for analysis is also less than one hour.

The analysis apparatus contained within the shielded case is basically a modification of the conventional Shirley rig heretofore utilized in determining dissolved gases. Essentially the apparatus contains conduits and valves for connection to a sample vessel contained within the sample cask, one connection being to the lower end of the vessel in the cask and the other to the upper end. A fluid circuit is completed which includes, within the analysis apparatus itself, a reversible pump capable of operation in a forward mode, a reverse mode and a neutral mode. In the forward mode the coolant liquid in the sample is drawn through the apparatus by the pump from the upper end of the sample vessel into the apparatus cyclically to mix the sample with the water and air contained within the apparatus.

The pump is then put in the neutral mode, in which communication through the pump is open, and an expansion apparatus is connected to the fluid circuit at a low point such that it is in communication with the liquid in the circuit. The expansion apparatus has a graduate or other receiver which is open to the atmosphere at its upper end. The dissolved gases separate from the diluted coolant causing liquid to rise in the graduate or other expansion receiver thus providing a measure, by the liquid level in the receiver, of the total dissolved gases in the sample.

The connection to the expansion apparatus is then closed, and a gas collection device is switched into the fluid circuit at a level above the horizontal level of the pump. The pump is again activated in its forward mode withdrawing fluids from the top of the sample vessel and from the upper end of the gas collection device, and returning the fluids to the bottom of the sample vessel. When the added air from the gas collection device has been thoroughly mixed with the other fluids, the pump is stopped, i.e. placed in the neutral mode. The liquids then settle entraping gases within the gas collection device. The gas collection device itself is provided with a septum to permit withdrawal of small amounts of the gases which are then removed through an opening in the shielded case for the apparatus for subsequent analysis.

The connection between the pump and the gas collection device is then closed; a vent to the atmosphere is connected to the upper end of the gas collection device; and the pump is actuated in the reverse mode to draw air through the system into the upper end of the sample vessel and withdraw liquid from the lower end of the sample vessel and discharge it through a flexible tube into a beaker contained within the shielded case. The beaker is provided with suitable electrodes for determining chloride.

Subsequent to determination of chloride a sample of the contents of the beaker is withdrawn through an opening in the case for boron analysis and liquid isotope analysis. The pump is then operated in the forward mode to withdraw the contents from the beaker and discharge them to the waste cask.

Figure 2:
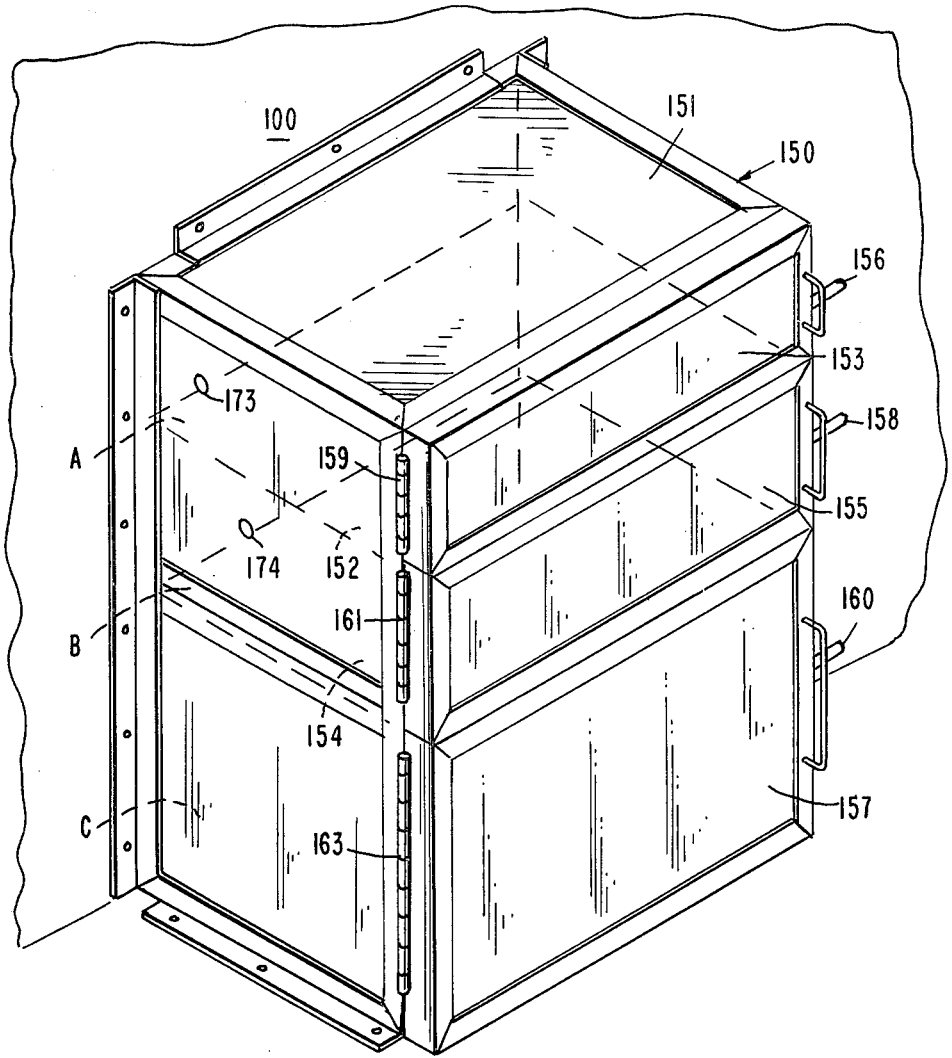
Figure 3:
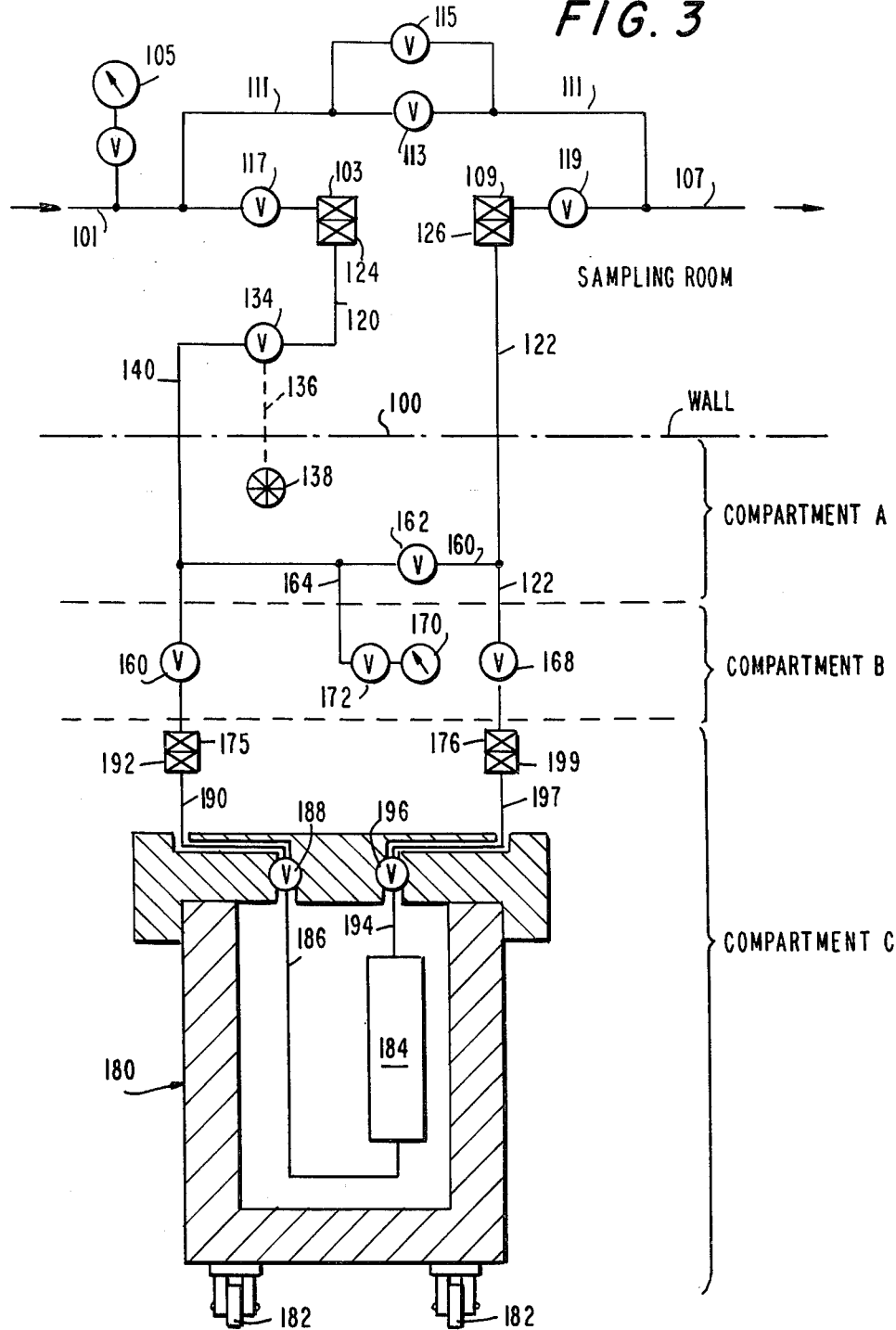
Figure 4:
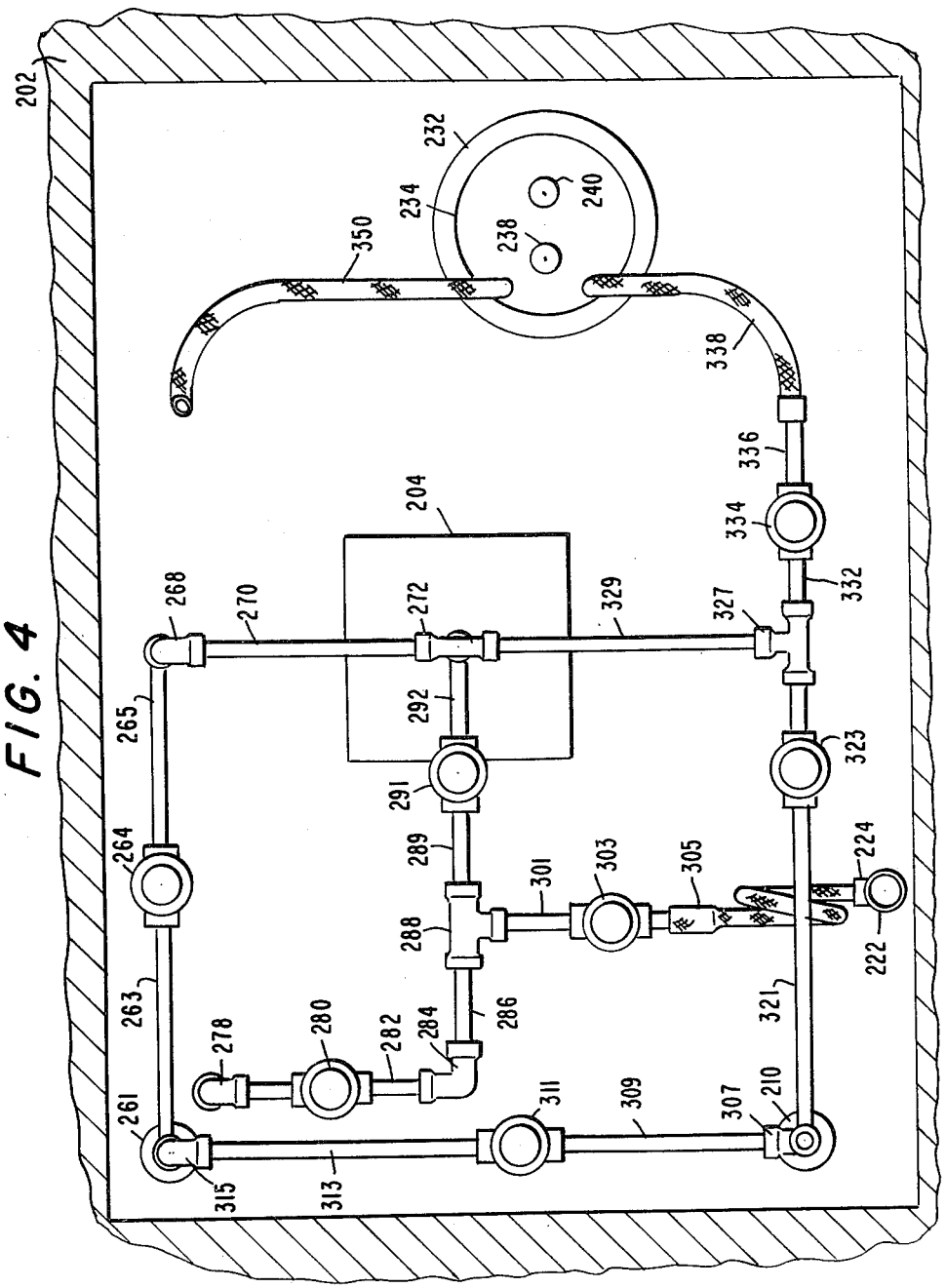
Figure 5:
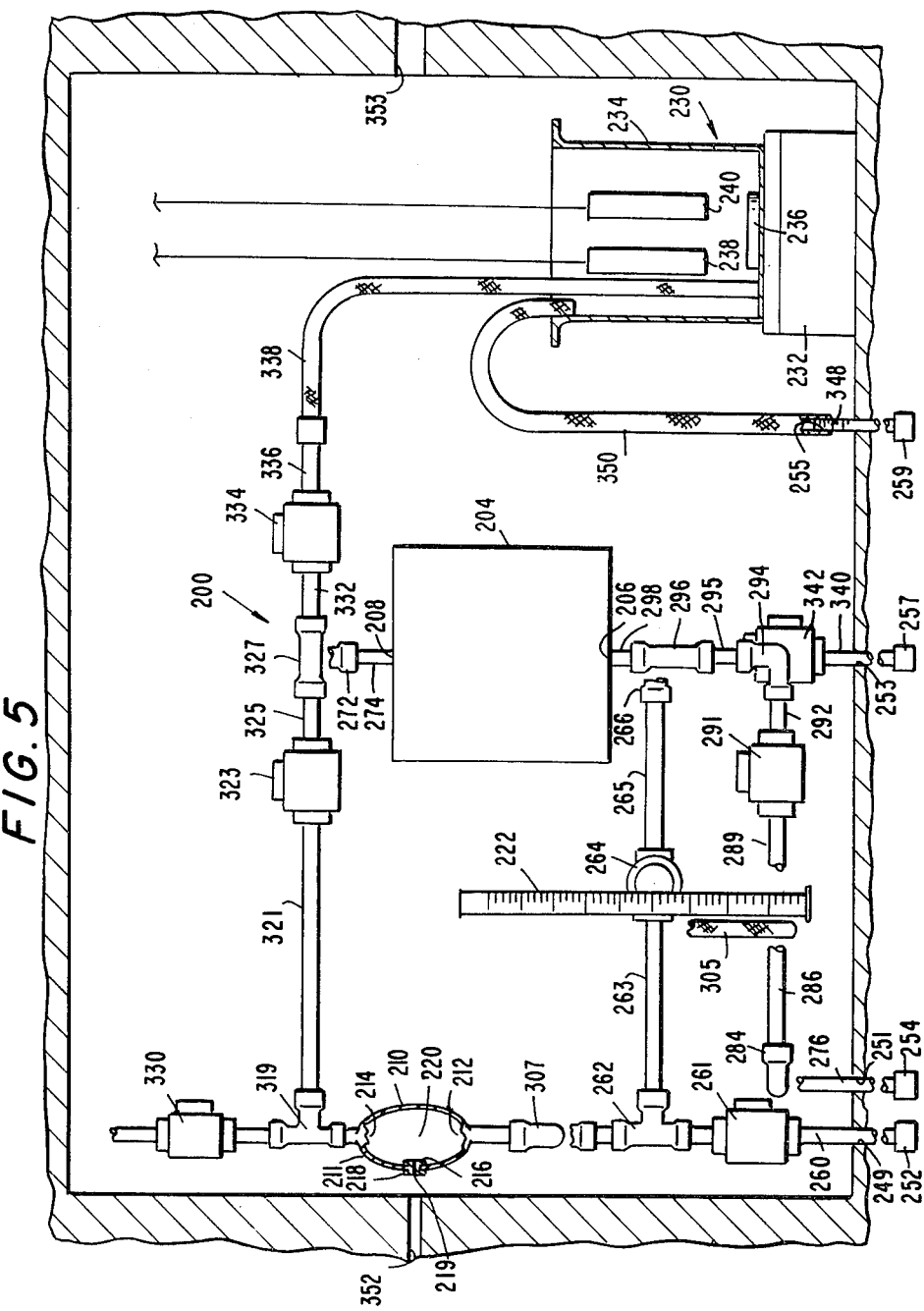

For a more complete understanding of the practical application of the principles of this invention reference is made to the appended drawings in which:

FIG. 1. is an isometric, somewhat schematic view illustrating piping connections and sampling room modification for connecting the line of primary coolant flow-through the sample room by which a representative sample of the coolant can temporarily be diverted into a shielded structure on the outer wall of the containment;

FIG. 2. is a front elevation of the shielded structure on the outer wall of the sampling room through which the sample is taken;

FIG. 3. is a schematic flow diagram illustrating the connection of a sample cask, containing a sample vessel shown in cross-section, to the sample line shown in FIGS. 1. and 2.;

FIG. 4. is a plan view of the interior of the shielded case for the analysis apparatus of this invention showing the location of the various components of the analysis apparatus;

FIG. 5. is a front elevation of the analysis apparatus shown in FIG. 4.

Figure 6:
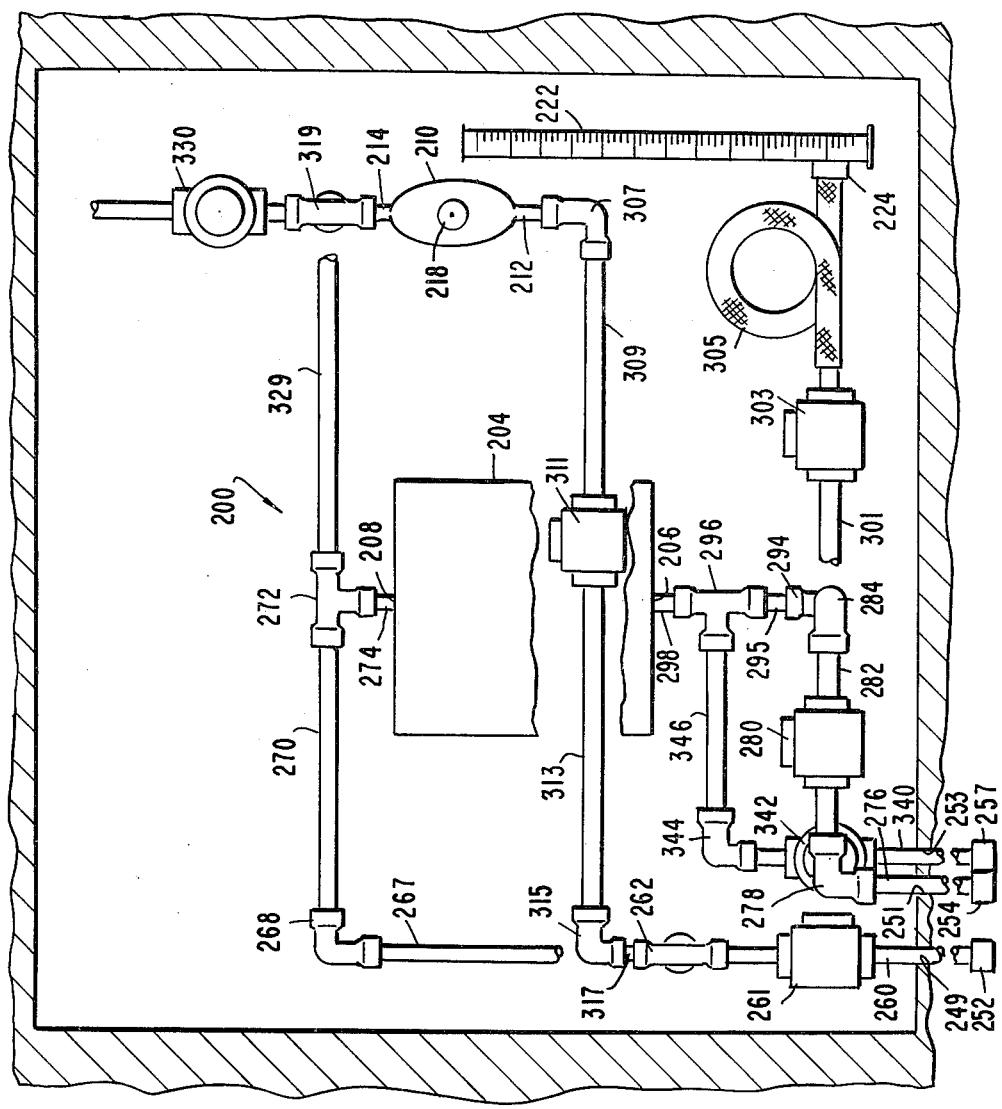

FIG. 6. is a side elevation of the analysis apparatus shown in FIG. 4.

Figure 10:
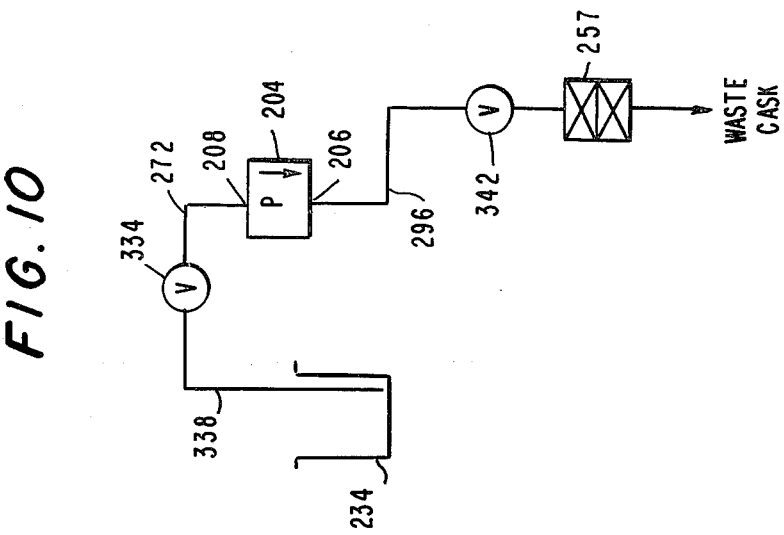
Figure 9:
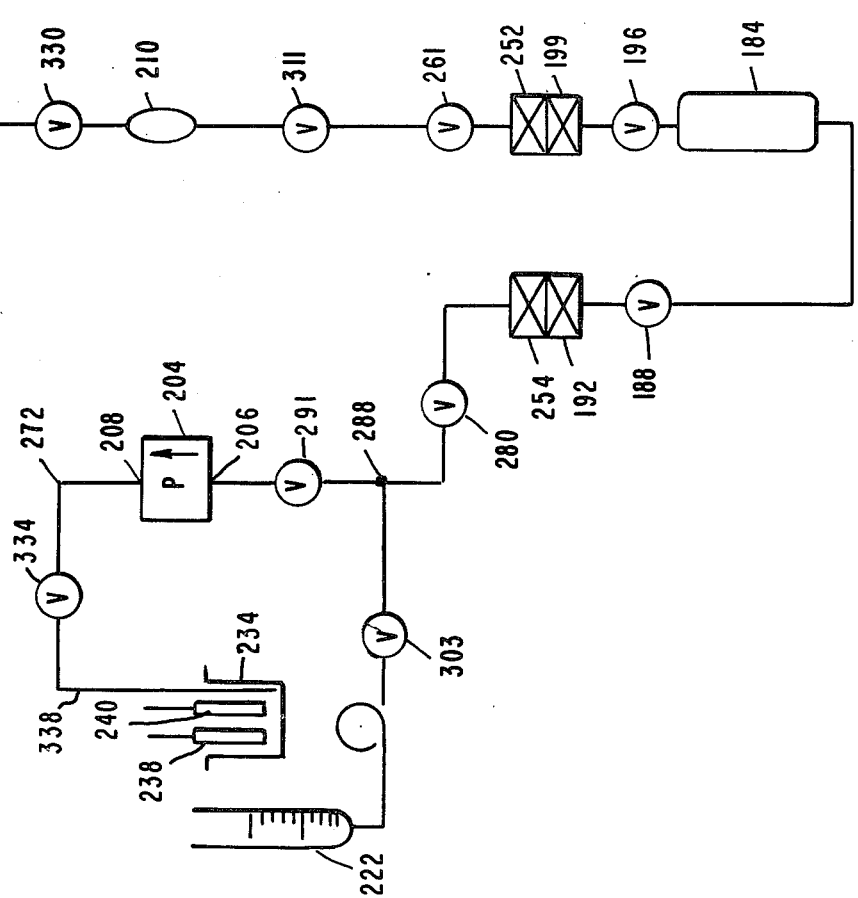

FIG. 7. is a schematic view of the apparatus shown in FIGS. 4-6, as connected to determine dissolved gas;

FIG. 8. is a schematic view of the apparatus shown in FIGS. 4-6, as connected to isolate a gas sample;

FIG. 9. is a schematic view of the apparatus in FIGS. 4-6, as connected to isolate a liquid sample for chloride and boron analysis; and FIG. 10. is a schematic view of the apparatus shown in FIGS. 4-6, as connected to discharge the liquid in the apparatus to a waste cask.

FIGS. 1-3 generally shown the modification of the sampling room for a pressured water reactor necessary to permit sampling in a post accident environment in accordance with this invention.

Referring particularly to FIG. 3. the reference numeral 100 refers to a wall of the sampling room. In the sampling room, which lies above wall 100, as seen in the schematic of FIG. 3., piping 101 leads to a position over the sample sink in the sample room where it terminates in a quick disconnect fitting 103. Piping 101 is drawn from the pressured primary coolant which is at a pressure on the order of two to three thousand pounds per square inch, typically 2235 psi, and at a temperature on the order of 500° F. Before entering line 101 as shown in FIG. 3., the coolant is lowered in pressure to approximately 160 pounds per sq. in. gauge and in temperature to approximately 100° F. A valved pressure indicator gauge 105 is connected to line 101 for reading the exact pressure in the line. A second line 107 is taken from a quick disconnect fitting 109 located over the sampling sink for return to the reactor coolant system at a low pressure point in the system.

Quick disconnect fittings 103 and 109 are bypassed by a line 111 which contains a first manually operable valve 113 for controlling flow through line 111 from line 101 to line 107. Valve 113 has a second manually operated valve 115 in parallel with it such that it is also connected in line 111 and can control the flow through line 111.

Piping 101 is further provided with a manually operated valve 117 connected in line 101 between its connection to bypass 111 and quick disconnect fitting 103. Piping 107 is similarly provided with a manually operated valve 119 connected in line 107 between quick disconnect fitting 109 and the connection of line 107 to bypass 111.

As described above the arrangement is conventional and is that normally found in the sampling room of a pressured water reactor. This system is designed to permit taking samples on the order of 500 ml for ordinary testing in the conventional manner. In taking samples the sample vessel is connected between quick disconnect fittings 103 and 109 with valves 117 and 119 closed. Valves 113 and 115 are opened to establish flow between lines 101 and 107 until equilibrum is established at which point valves 117 and 119 are opened and valves 113 and 115 are closed to reestablish flow to the sample vessel. When this reaches equilibrum, valves 117 and 119 are closed, and the sample vessel is disconnected from fittings 103 and 109 for removal to the testing laboratory.

In order to draw samples of the primary coolant in a post accident environment it is necessary to provide a sampling connection located outside the sampling room. This can be accomplished by providing a pair of lines 120 and 122, for example of ⅜″ stainless steel tubing, which are securely fastened to supporting structure and lead from the sampling sink to sampling room wall 100. At the sampling sink lines 120 and 122 are respectively provided with quick disconnect fittings 124 and 126 which are at all times connected to sampling quick disconnect fittings 103 and 109 respectively, except when the latter are utilized to draw samples in the conventional manner.

Referring more particularly to FIG. 1 at the location where lines 120 and 122 are brought adjacent to the inside of wall 100, wall 100 is provided with three bores 128, 130 and 132 which extend from the inside of wall 100 to the outside of wall 100 horizontally at a height of approximately 5'2" above the floor on the outside of wall 100.

Pipeline 120 is brought to a position adjacent the inner end of bore 130 where it terminates in a manually operated valve 134 secured to the inner face of wall 100. Valve 134 has a reach rod 136 extending through bore 130 terminating in a control handle 138 positioned outside wall 100. Line 120 is connected through valve 134 to an additional line 140 which extends through bore 128 to the exterior of wall 100 adjacent handle 138. Preferably the spacing of bores 128 and 136 is on the order of 1 foot or more. Return line 122 is taken directly through bore 132 to the exterior of wall 100.

Referring more particularly to FIG. 2., at the location of bores 128, 130 and 132 the outside of wall 100 is provided with a shielded compartmented structure 150. Structure 150 is in the form of an inverted, U-shaped frame 151 having an open bottom, open front and open rear. Frame 151 is approximately 10½" deep and 5' 10½" high and is constructed using lead plate held in position by a welded steel frame such that a 3" lead thickness is provided between the interior of structure 150 and the environment on both the sides and the top of frame 151. Interiorly frame 151 is further provided with two 3" thick lead shelves 152 and 154 extending across frame 151 subdividing structure 150 into three vertical compartments A, B, and C. (see also FIGS. 2 and 3). Doors 153, 155 and 157 formed of 3" lead are positioned over the front openings of compartments A, B, and C, respectively, being hinged by piano hinges 159, 161 and 163, respectively, at their left sides to the left side of frame 151. Latches which are secured with hand nuts 156, 158, and 160, respectively, are employed to retain doors 153, 155 and 157 in closed position.

Doors 153, 155 and 157 are sized completely to cover the front face of frame 151, being lined up on their edges with the top face and side faces of frame 151. At the joints between doors 153 and 155 and between doors 155 and 157 the edges of the doors line up with the mid points of shelves 152 and 154, respectively, and are provided with sufficient clearance to prevent binding when they are opened.

The open rear of structure 150 is bolted to the exterior of wall 100 and to the floor such that upper compartment A covers the exterior openings of bores 128, 130 and 132. Inlet line 140 is connected to outlet line 122 in compartment A by an interconnecting line 165 which contains a remotely operable valve 162 also located in compartment A. A ⅜" diameter hole 173 is provided in a side of frame 151 for a reach rod to valve 162.

Shelf 152 which separates compartments A and B is provided with three small openings leading from compartment A to compartment B. Line 140 below connection to line 165 passes through one such opening. An extension of line 122 below line 165 extends through a second such opening and a line 164 connected to line 165 between line 140 and valve 162 extends through the third such opening.

In compartment B line 140 leads to a remotely operated ball valve 166 which is mounted on the exterior of wall 100 in compartment B, and line 122 leads to a remotely actuable ball valve 168 similarly mounted on wall 100 and located in compartment B. Line 164 leads to a valved pressure indicator 170 which is also located in compartment B along with its control valve 172. Both indicator 170 and valve 172 are also physically mounted on the exterior of wall 100. A small opening 174 (see FIG. 2) extends through the side of frame 151 to permit reach rod connections to valves 166, 168 and 172 for their remote operation.

Valves 166 and 168, respectively lead to openings through shelf 154 where they respectively, terminate in quick disconnect fittings 175 and 176 which are mounted on the underside of shelf 154 such that they are accessible in compartment C.

A sample is drawn off through the sample line shown in FIGS. 1–3 by means of a sample cask 180, shown somewhat schematically in cross-section in FIG. 3. Sample cask 180 is a hollow lead lined structure mounted on four casters 182 to permit it to be rolled around and positioned as desired. Cask 180 is sized to be received within compartment C of structure 150, such that its upper end is closely adjacent to quick disconnect fitting 175 and 176. Cask 180 contains 3 to 4 inches of lead shielding entirely about its hollow interior. A sample vessel 184 is mounted in the hollow interior of cask 180 and is connected at its lower end by a conduit 186 through a valve 188 mounted in the top of cask 180 which leads through flexible tubing 190 to a quick disconnect fitting 192 extending above the top of cask 180. The upper end of vessel 184 is similarly connected through a conduit 194 through a valve 196 similarly located in the top of cask 180 which connects through a flexible conduit 197 to a quick disconnect fitting 199 extended above the top of cask 180.

Thus when it is desired to collect a sample of the primary coolant through the system, sample cask 180 can be wheeled into compartment C and attached by means of quick disconnect fittings 192 and 199 to quick disconnect fittings 175 and 176, respectively, as more fully described hereinafter.

It will be noted that conduits 186 and 194, as they are lead through the top of sample cask 180, are offset to prevent streaming of radiation through the openings in the top of cask 180 required to accommodate them. Similarly, (though not shown) valves 188 and 196 are operated manually by extending reach tools through openings in the top of cask 180.

Referring more particularly to FIGS. 4, 5 and 6 there is shown analysis apparatus in accordance with this invention generally designated by the reference numeral 200.

Apparatus 200 is housed within a lead shielded case 202 having approximately 3" thickness of lead and inside dimensions of 20" long by 14" high by 14" deep. The front of case 202 (1 of the long faces) is made of lead glass to permit visual inspection of the interior of the case and hence of apparatus. Case 202 is mounted at a sufficient height to permit positioning sample cask 180 beneath it and also to permit positioning a waste cask for collection of waste liquids beneath case 202.

Analysis equipment 200 includes a reversible, peristaltic pump 204 having a capacity of 50 to 100 cc per minute. Pump 204 has an inlet/outlet port 206 on its underside and a second inlet/outlet port 208 on its top. It is capable of operation on a forward mode to draw fluids from port 208 and deliver them through port 206, a reverse mode to draw fluids from port 206 and deliver them to port 208 and a neutral mode in which ports 206 and 208 are in open communication.

Apparatus 200 further includes a gas collection device in the form of a glass bulb 210 having a first, necked opening 212 on its underside and a second neck opening 214 on its top. The side wall 211 of bulb 210 is provided with an opening 216 intermediate openings 212 and 214 which is fitted with a rubber septum 218 having a normally closed central bore 219 through which a cannula can be inserted to provide exterior communication with the interior 220 of bulb 210.

Analysis equipment 200 further includes an expansion arrangement including a liquid receiver in the form of a glass graduate column 222 having an open upper end and provided with inlet fitting 224 adjacent its lower end. Graduate 222 is conventional and has a capacity of approximately 25 ml with graduations etched along the column to permit accurate determination of the level of a liquid in graduate 222.

Analysis equipment 200 further includes a chloride determining and liquid sample isolating device 230 located to the right in case 202, as seen in FIGS. 4 and 5, which includes a magnetic stirrer device 232 seated on the floor of case 202 on which is positioned a glass 150 ml beaker 234. Beaker 234 contains in its bottom a magnetically actuable stirrer element 236 and a pair of electrodes 238 and 240 which are spaced and mounted vertically by suitable brackets not shown for connection externally to an electrical circuit for conventional chloride determination of an aqueous liquid contained in beaker 234.

Shielded case 202 is provided with 4 openings in its underside 249, 251, 253 and 255. Openings 249 and 251 are located generally to the left and rear of case 202, as seen in FIGS. 4, 5 and 6, and are designed to align with the quick disconnect fittings 192 and 199 of a sample cask 180 when installed beneath case 202. Openings 253 and 255 are similarly located generally to the center and rear of case 202, and are positioned to align with quick disconnect fittings on a waste cask which can be installed beneath case 202 alongside a sample cask 180. Case 202 is further provided with additional openings in its sides and top described later with reference to the positioning of the various components of analysis equipment 200 within case 202.

Quick connection devices 252 and 254 are mounted on case 202 beneath openings 249 and 251 respectively, (see also FIGS. 7, 8, and 9), and quick connection devices 257 and 259 are mounted on the underside of case 202 beneath openings 253 and 255 (see also FIG. 10).

A fluid conduit is provided for connecting quick disconnect fitting 252 to upper port 208 of pump 204. Such conduit includes a vertical section of tubing 260 leading through opening 249 to a solenoid operated valve 261 connecting to a tee 262. The leg of tee 262 leads through a horizontal tube 263 connected through a solenoid operated valve 264 to an additional horizontal run of tubing 265.

Tubing 263, valve 264 and tubing 265 are all located below the level of lower port 206 of pump 204. Tubing 265 connects through an elbow 266 to a upward, vertical tube 267 leading to a second elbow 268 located above the level of port 208 of pump 204. Elbow 268 leads through a horizontal run of tubing 270 to a tee 272 located immediately over port 208. A depending tube 274 interconnects the leg of tee 272 and port 208.

A second conduit arrangement is provided interconnecting quick disconnect fitting 254 with lower port 206 of pump 204. This arrangement includes a vertical section of tubing 276 extending from quick disconnect fitting 255 up through opening 253 in case 202 to an elbow 278 which leads horizontally to a solenoid operated valve 280. Valve 280 which is located close above the bottom of the interior of case 202 and is positioned adjacent the left end of case 202, as seen in FIG. 4, leads toward the front of case 202 to an elbow 284 through tubing 279, a solenoid operated valve 280 and tubing 282. Elbow 284 leads across case 202 sequentially through a short horizontal length of tubing 286, a tee 288, tubing 289, a solenoid operated valve 291 and tubing 292 to an elbow 294 located directly under lower pump port 206. Elbow 294 is connected upwardly through a short section of tubing 295, a tee 296 and another section of tubing 298 to port 206.

Graduate cylinder 222 physically is positioned adjacent the front of case 202 in order to permit ready visibility through the lead glass front panel of case 202. A connection is provided for communicating inlet fitting 224 of graduate 222 with tee 288. The leg of tee 288 is thus provided with a short horizontal section of tubing 301 leading forward across the bottom of case 202 through a solenoid operated valve 303 which is connected through a section of flexible tubing formed in a loop 305 to take up expansion and in turn connected to inlet 224. Graduate 222 is positioned vertically with inlet 224 at the same horizontal level as tubing 286, 301, etc.

Gas bulb 210 physically is located inside case 202 at a horizontal level approximately at the upper side of pump 204 and physically in the forward left corner as seen in FIGS. 4 and 5 lower necked opening 212 to the interior collection zone 220 is connected to an elbow 307 located at approximately the horizontal level of pump 204 which connects to a horizontal run of tubing 309 extending rearwardly along the left side of case 202 as seen in FIG. 4. through a solenoid actuated valve 311 and an additional run of horizontal tubing 313 to an elbow 315 aligned over tee 262 to which it is vertically connected by a depending tubing 317.

Upper opening 214 to gas collection zone 220 in gas bulb 210 is connected to a tee 319 aligned above opening 214 from the leg of which a horizontal tube 321 extends across the front of case 202 above the upper level of pump 204 through a solenoid actuated valve 323 and an additional horizontal tube 325 to a tee 327. The leg of tee 327 extends rearwardly and is connected through a horizontal tube 329 to tee 272, thus providing a connection from the upper end of gas bulb 210 to port 208 of pump 204. Tee 319 is also connected upwardly through a solenoid actuated valve 330 to the atmosphere inside case 202 near the top of the interior of the case.

An arrangement is provided for delivering and withdrawing liquid from beaker 234 by connection to pump 208 through tee 327 which is connected through a horizontal arrangement including a short piece of tubing 332 leading through a solenoid actuated valve 334 to a fitting 336 to which a length of flexible tubing 338 is attached. Fitting 336 is located well above the upper level of beaker of 234 on magnetic stirrer stand 232, and the length of flexible tubing 338 is sufficient to carry it from fitting 336 to closely adjacent to the bottom of beaker 234.

The analysis apparatus 200 contained within case 202 further includes connections to a waste cask, as indicated above, through a pair of holes 253 and 255 located in the bottom of case 202. These include a vertical tube 340 extending upwardly from quick disconnect fitting 257 through hole 253 in the floor of case 202 to a solenoid operated valve 342 located near the rear of case 202 to the rear of pump 204. Solenoid valve 342 leads upwardly to an elbow 344 leading to a horizontal forwardly extending run of tubing 346 feeding into the leg of tee 296 thus providing a valved connection to the waste cask from lower port 206 of pump 204.

Normally in connecting a waste cask a vent line is required, as well as a discharge line, in the event of overflow of liquid in the cask. This is provided through connection to quick disconnect fitting 259 to which is attached a short vertical nipple 348 extending up through opening 255 in the bottom of case 202 closely adjacent to opening 253. A length of flexible tubing 350 is fitted over nipple 348 where this projects above the bottom of case 202, and flexible tubing 350 is extended over the lip of beaker 234 such that in the event of any overflow in waste cask the overflow will be dumped in beaker 234.

In addition to the openings for connection to a sample cask and to a waste cask an opening 352 is provided in the side wall of case 202 aligned with the bore 219 through septum 218, and an opening 354 is provided in the opposite side wall of case 202 over the location of beaker 234. Additional openings (not shown) through case 202 are required for electrical connections to the various valves, pump and electrodes. Their location is not critical.

Following an accident in a pressured water reactor system which contraindicates entry into the containment area for the purpose of sampling, samples of the primary coolant can be drawn outside the containment as shown with reference to FIGS. 1-3.

A sample cask 180 with an empty sample vessel 184 and closed sample valves 188 and 196 is wheeled up to shielded structure 150 and positioned in compartment C with doors 153 and 155 remaining closed. Quick disconnect fittings 192 and 199 on sample cask 180 are then connected to fittings 175 and 176, respectively. At this point valves 117 and 119 are closed, as are valves 134, 162, 166 and 168. Valves 113 and 115 are open.

In the sampling room valves 113 and 115 are then closed; valves 117 and 119 are opened. Then valves 134 and 162 are opened. The isolation valves to the sampling room are then opened to establish flow through line 101, line 120, by pass 160, line 127 and line 107.

Ball valves 166 and 168 are then opened. Valve 162 is adjusted to keep the indicated pressure on gauge 170 at 100 psi. Door 155 is opened to permit access to compartment B when reading gauge 170.

When the radiation levels through lines 140 and 122 and bypass 160 are stabilized sample cask valves 183 and 196 are opened, and throttle bypass valve 166 is adjusted to hold pressure at 100 psi thus filling sample vessel 184 with coolant at 100 psi.

After radiation levels on the cask have stabilized bypass valve 162 is opened fully, and then cask valves 188 and 196 are closed. Ball valves 166 and 168 are then closed, and cask 180 is disconnected and removed from structure 150. The cask is then moved to the location of analysis apparatus 200.

Prior to utilizing analysis apparatus 200 it is necessary to set the equipment up and have it ready for connection to sample cask 180. Also prior to using analysis apparatus 200 certain other matters should be checked. The radiochemical fume hood over the apparatus should be checked and be on; the gas chromatograph should be on; the plasma emission spectrometer should be on; power should be available for operating the apparatus and the gamma spectroscopy system should be operational.

Chloride electrodes 134 and 240 should be prepared in accordance with standard operating procedure.

Apparatus 200 is then charged with the deionized and degassed water to fill the expansion loop and position water at the 0 gradation in graduate 222. This is accomplished by attaching a source of deionized and degassed water to quick disconnect fitting 254, which is on the downstream side of valve 280. Valves 280 and 334 are then opened, and pump 204 is placed in its neutral mode. Valve 291 is then opened, and water flows into the system from fitting 254 until the level is just visible at the tubing connection to port 206 of pump 204. Valve 291 is then closed. Valve 303 which leads to gas expansion loop 305 and graduate 222 is then opened, and water flows into the expansion loop filling it. Valve 303 is closed when the level of water reaches the lowest gradation in graduate 222. A record should be made of the level. Valves 280 and 334 are then closed and the water supply is removed from fitting 254. The quantity of water utilized to fill the system should be recorded as this information is later necessary in preparing for the chloride analysis and in calculating dilution.

A clean beaker 234 is then rinsed thoroughly with deionized and degassed water and 1 ml of 2 molar $HNO_3$ is added to beaker 234 along with a quantity of deionized and degassed water sufficient, together with the water previously added to the system and volume of sample cask 180 to total 100 ml. Typically this might be 8 ml of water added to beaker 234. The chloride electrodes are then lowered to approximately 1 inch from the bottom of beaker 234, and the magnetic stirring rod 236 is added. Beaker 234 is then positioned alongside the remaining apparatus 200 on magnetic stirrer 232, and tubes 338 and 350 are positioned in beaker 234. Care should be taken that tube 238 reaches close to the bottom of beaker 234.

The lead side cover for case 202 is then installed and positioned to close case 202.

The gas space in the apparatus is then purged with air by opening valves 330, 311, 264, and 342. Quick disconnect fitting 257 is also opened by inserting a quick disconnect insert into it. Pump 204 then is energized in the forward mode to draw air in through the vented side of valve 330 purging the opened valves, their interconnecting lines and pump 204. Pump 204 is run for approximately 2 minutes and then turned off. Valves 330, 311, 264 and 342 are then closed, and the quick disconnect insert removed from fitting 257. A waste cask is then connected to quick disconnect fitting 257 and 259.

A 1000 ml volumetric flask utilized for later in dilution of liquid samples is then filled with deionized degassed water from which 1 ml is then removed such that the flask contains 999 ml of water. At this point the apparatus is ready for use, and a sample cask 180 with a filled sample vessel 184 is connected by connecting quick disconnect fitting 192 and 199 of cask 180 to quick disconnect fittings 254 and 252, respectively, of apparatus 200.

Referring to FIG. 7. a fluid cycle is set up in apparatus 200 for withdrawing the sample from vessel 184 and mixing it with the diluant water added to the system before analysis. Before opening sample cask valves 188 and 196 to connect vessel 184 with the system, as a precautionary step the valves in the apparatus should be checked to make sure they are all shut. These are valves 261, 264, 280, 291, 303, 311, 323, 330, 334 and 342. Valves 188 and 196 can then be open to connect vessel 184 with apparatus 200.

The first analysis procedure is determination of dissolved gas. Valve 280 is opened, and the 100 psi pressure on the sample is relieved by cycling valve 303 open and shut and then finally shutting it. Valve 291, valve 264 and valve 261 are then opened to establish a fluid circuit including pump 204 and sample vessel 184. Pump 204 is then energized in the forward mode for a period of thirty to sixty seconds and then is deenergized. Valve 303 is reopened and then shut when the level of liquid in graduate 222 stabilizes. This procedure of running pump 204 and then opening valve 303 is repeated until no further change, i.e. less than 0.2 ml, occurs in the maximum reading on graduate 222, which is then recorded. The difference between the initial reading and the final reading is, of course, that gas which was dissolved in the reactor primary coolant which is insoluble at the barometric pressure. The total gases are calculated by simple application of Henry's law having a knowledge of the volume of sample, e.g., 40 ml, the added water diluant, the barometric pressure and the fact that the residual dissolved gas at one atmosphere is 16.6 cc/kg.

Following these steps valve 264 is closed and a different fluid cycle is set up in apparatus 200, as shown in FIG. 8 for isolation of a gas sample for hydrogen determination and determination of isotopes and gas activity. As seen in FIG. 8. valves 311 and 323 are opened to connect gas collection vessel 210 in a fluid circuit through pump 204 and vessel 184. Pump 204 is then energized in the forward mode for a period of 5 minutes, and then is stopped (neutral mode). Liquids then settle out by gravity, leaving gas in collection zone 220.

A syringe having a long needle is then inserted in through opening 352 into bore 219 of septum 218 to withdraw a sample of the gases collected in collection zone 220 in bulb 210. 1 microliter is so withdrawn and is inserted into the gamma spectroscopy system for counting. The quantity so withdrawn is determined on a design basis that the 1 ml would contain 80 microcuries. In calculating activity and percentage of hydrogen, allowance must be made for the dilution by purge air introduced before connection to vessel 184.

An additional 10 microliters of gas are then withdrawn from bulb 210 in the same manner and injected into the gas chromograph for analysis for hydrogen.

Chloride, boron, and liquid isotopes are then determined by establishing yet another fluid circuit in apparatus 200, as shown in FIG. 9, by closing valve 323, checking to make sure that valve 264 is shut and then by opening valves 330 and 334 to set up a one-way flowpath through apparatus 200 from the atmospheric vent at valve 330 to discharge line 338 and into beaker 234. Valves 291, 280, 261, and 311 should remain open from the previous (FIG. 8.) arrangement.

Pump 204 is then energized in its reverse mode to draw liquid from the system and admit air into the system through vessel 184 and from the bottom of vessel 184 through pump 204 and out through discharge tube 338 into beaker 234. When no further liquid is discharged, valve 280 is shut and valve 303 is opened to withdraw the liquid remaining in graduate 222 and the lines connected to it. When this liquid has been withdrawn and emptied into beaker 234, pump 204 is shut down. Valves 334, 291, 303, 261, 311, and 330 are then closed.

The chloride content of the sample of primary coolant is then determined electrically utilizing electrodes 238 and 240 having due regard for the dilution caused by the presence of the water added to apparatus 200. 1 ml of the liquid in beaker 234 is then removed through opening 354 utilizing a syringe with a 12" needle or other long adapter. This is put in the flask containing the 999 ml and mixed throughly. 10 ml are then removed from the flask and analyzed for boron utilizing plasma emission spectrometry. Further samples can be removed from the flask and utilized for determining liquid isotope concentration. The last usually will require further dilution to reduce the activity to bring it within the range of the instrumentation.

When the gas determination has been completed and samples of liquid and gas has been withdrawn for analysis the apparatus is then connected to remove the liquid contents and transfer them to the waste cask. This is done, referring more particularly to FIG. 10, by setting up a flow path interconnecting beaker 234 through pump 204 to waste cask. First valves 323, 264, and 291 should be checked to be sure they are closed. Then valves 334, and 342 are opened to establish the flowpath shown in FIG. 10, and pump 204 is energized in the forward mode. When beaker 234 has been pumped out to the lowest level possible or in the event water should issue through vent tubing 350, the pump is stopped, and valves 334 and 342 closed. The apparatus is then ready for cleaning out and setting up for the next analysis.

We claim:

1. Analysis apparatus for isolating liquid and gas samples from a pressurized liquid containing dissolved gas and for determining the amount of such dissolved gas which includes:

reversible pump means having first and second ports, said pump means being operable in a forward mode to draw fluid from said first port and to discharge such fluid through said second port, in a reverse mode to draw fluid from said second port and to discharge such fluid through said first port, and in a neutral mode in which communication between said first and second ports is open;

closed gas collection means having wall means defining a gas collection zone, a first opening in said wall means into said zone adjacent the upper end thereof and a second opening through said wall means into said zone adjacent the lower end thereof, and a septum in said wall means for permitting access to the interior of said zone;

expansion means including a receiver, an inlet at the lower end of said receiver, an opening to the exterior at the upper end of said receiver and means for determining the vertical position of a liquid in said receiver;

said expansion means being positioned with said inlet below the vertical level of said pump means, said pump means being positioned with said first port located below the vertical level of said second port, and said gas collection means being positioned with said second opening located above the vertical level of said second port of said pump means;

first and second connecting means located below the vertical level of said inlet to said receiver for external connection to a sampling vessel;

first conduit means interconnecting said first sample connecting means and said first port of said pump means, first and second valve means located serially in said first conduit means for controlling fluid flow therethrough;

second conduit means interconnecting said second port of said pump means and second sample connection means, third and fourth valve means serially connected in said second conduit means for controlling fluid flow therethrough;

third conduit means interconnecting said inlet to said receiver of said expansion means and said first conduit means at a point between said first and second valve means therein, fifth valve means connected in said third conduit means for controlling fluid flow therethrough;

fourth conduit means interconnecting said second opening in said gas collecting means and said second conduit means at a point between said third and fourth valve means, sixth valve means connected in said fourth conduit means for controlling fluid flow therethrough;

fifth conduit means interconnecting said first opening to said gas collection means and said second conduit means at a point therein between said third and fourth valve means, seventh valve means in said fifth conduit means for controlling fluid flow therethrough;

vent means for connection to the exterior located at a position above the level of said second opening of said gas collection means and said second port of said pump means and above the vertical level of said fourth conduit means, sixth conduit means interconnecting said second opening of said gas collection means and said vent means including eight valve means located in said sixth conduit means for controlling fluid flow therethrough;

liquid sample delivery means having a flexible delivery tube opening at its lower end at a position below the vertical level of the first port of said pump means, seventh conduit means interconnecting said first port of said pump means and said delivery tube, and ninth valve means located in said seventh valve means for controlling fluid flow therethrough; and waste discharge means including a discharge connection for connection to a waste cask located at a level below the vertical level of said first port of said pump means including eighth conduit means interconnecting said waste connection and said first port of said pump means and tenth valve means in said eight conduit means for controlling fluid flow therethrough.

* * * * *